United States Patent [19]

Hotta et al.

[11] Patent Number: 5,352,521

[45] Date of Patent: Oct. 4, 1994

[54] RESIN PARTICLES, METHOD FOR PRODUCTION THEREOF AND THEIR USES

[75] Inventors: Yasunari Hotta; Satoshi Maeda; Yozo Yamada, all of Ohtsu; Koji Tanaka; Hiroshi Ono, both of Okayama; Toshio Uno, Ohtsu, all of Japan

[73] Assignee: Toyo Boseki Kabushiki Kaisha, Osaka, Japan

[21] Appl. No.: 183,516

[22] Filed: Jan. 19, 1994

Related U.S. Application Data

[60] Division of Ser. No. 32,441, Mar. 16, 1993, which is a continuation of Ser. No. 616,060, Nov. 20, 1990, abandoned.

[51] Int. Cl.$^5$ ................................................ B32B 5/16
[52] U.S. Cl. .................................. 428/402; 428/323; 428/324; 428/327; 428/357; 523/200; 523/201; 524/539; 524/543; 524/556; 524/591; 525/902
[58] Field of Search ............... 428/402, 323, 324, 327, 428/357; 427/195; 523/200, 201; 524/539, 543, 556, 591; 525/902

[56] References Cited

U.S. PATENT DOCUMENTS 4,623,706 11/1986 Timm et al. .......................... 526/88
4,717,620 1/1988 Bowen et al. ....................... 428/323

Primary Examiner—John Kight, III
Assistant Examiner—Duc Troung
Attorney, Agent, or Firm—Leydig, Voit & Mayer, Ltd.

[57] ABSTRACT

Spherical resin particles in micron order with a narrow particle diameter distribution, methods for the production thereof and uses thereof are disclosed. Overcoming various problems comprised in the hitherto-known polymerization granulation methods, resin particles using a condensation polymer in micron order of the present invention having spherical form and narrow particle diameter distribution serve well for various applications.

23 Claims, No Drawings

RESIN PARTICLES, METHOD FOR PRODUCTION THEREOF AND THEIR USES

This is a divisional of copending application(s) Ser. No. 08/032,441 filed Mar. 16, 1993, now allowed Mar. 4, 1994 which is a continuation of Ser. No. 07/616,060, filed on Nov. 20, 1990, now abandoned.

BACKGROUND OF THE INVENTION

This invention relates to spherical resin particles in micron order with a narrow particle diameter distribution, to methods for the production thereof and to uses thereof. Specifically, this invention relates to resin particles which have been widely used as matting agents, blocking-preventive materials, carriers for chromatography, carriers for medicaments, powder paints and varnishes, gap-adjusting materials, toners for electrophotography, cosmetics, and the like.

In recent years, polymer beads have been put into wide use as matting agents, blocking-preventive materials, organic pigments, carriers for chromatography, carriers for medicaments, powder paints and varnishes, gap-adjusting materials, toners, and the like. Polymer beads used for such purposes are required to have a particle diameter ranging from 0.1 to 100 $\mu$m, a narrow particle diameter distribution and a spherical shape.

As examples of the resin particles hitherto usable for the above-mentioned purposes, mention can be made of resin particles which are prepared by a polymerization granulation method. Polymerization granulation methods are generally classified into emulsion polymerization method, suspension polymerization method, seed polymerization method and dispersion polymerization method, which are discussed hereunder.

EMULSION, POLYMERIZATION METHOD

In this method, resin particles are obtained by polymerization in the micelles of polymerizable monomers stabilized by surfactants in water.

According to the emulsion polymerization method, particles having a sharp particle diameter distribution can be obtained. However, the particle diameters are decided by the size of the micelles existing stably, confining the diameter range to from about 0.01 to about 0.5 $\mu$m, and it is not possible to prepare particles having a particle diameter of about 1 $\mu$m or more. Besides, surfactants essential for stabilization of the micelles remain on the surface of the particles prepared, which also limits the applicable use of the obtained resin particles.

SUSPENSION POLYMERIZATION METHOD

According to this method, polymerizable monomers are polymerized to afford particles in a suspension system obtainable by mechanically stirring a mixture of water and the polymerizable monomers.

In the suspension polymerization method, it is not easy to polymerize in a stable system. In addition, it is difficult to obtain fine polymer particles having a uniform particle diameter distribution, since the particle sizes depend on the mechanical stirring.

For this reason, a suspension-stabilizing agent is used in suspension polymerization to prevent particles from coalescence and to stabilize the polymerization. As such suspension-stabilizing agents, use is generally made of sparingly soluble inorganic compounds, for example, sparingly soluble salts such as barium sulfate, calcium sulfate, magnesium carbonate, barium carbonate, calcium carbonate and calcium phosphate; metal oxides such as silica, calcia, magnesia, titanium oxide; minerals such as diatomaceous earth, talc, clay and kaolin; and their mixtures or water-soluble mixtures, such as polyvinyl alcohol, gelatin and starches.

Actually, even when said suspension-stabilizing agents are used, the particle diameters of the particles obtained by the suspension polymerization method are about several dozens $\mu$m or more and the particle diameter distribution thereof is broad, which gives rise to the classification after polymerization.

SEED POLYMERIZATION METHOD

The seed polymerization method has been proposed to solve the above-mentioned problems. Therein, particles obtained by another method are used as seed particles, and are imbibed with solvents and a polymerizable monomer. The thus-obtained particles are allowed to grow by polymerization within the imbibed seed particles.

In the seed polymerization method, it is, in principle, possible to obtain particles having a sharp particle diameter distribution by selecting suitable seed particles, and the particle diameters con be controlled according to the imbibition ratios of the seed particles and polymerizable monomers.

The seed polymerization method was originally devised for the purpose of producing particles having a particle diameter between 0.01–0.5 $\mu$m obtainable by the emulsion polymerization method and several dozens $\mu$m or more obtainable by the swelling polymerization method. Accordingly, as a matter of fact, the particles usable as seed particles in the industrial seed polymerization are often limited to particles obtainable by the emulsion polymerization method, namely, vinyl polymer particles. However, it is difficult to imbibe vinyl polymer particles using polymerizable monomers. The imbibition ratio is decided by the interaction of the polymer composing the seed particles with the monomer used for imbibition and by a balance with a surface tension of the imbibed particles, and thus the imbibition ratio is actually limited to 2–10 times at most.

Alternatively, the imbibition ratio cannot be increased extremely, since the particle diameters which can be enlarged at one time is limited. Ten times the particle diameter corresponds to 1,000 folds the volume, and extreme imbibition necessitates repeated seed polymerization.

TWO-STEP IMBIBITION SEED POLYMERIZATION METHOD

This method was devised For the purpose of increasing the imbibition ratio of seed particles. In the 2-step imbibition seed polymerization method, seed particles are imbibed with an oligomer or a sparingly soluble lower molecular substance (a imbibing agent), etc., whereafter particles further imbibed with a polymerizable monomer. By this method, the imbibition ratio of the seed particles can be increased to several thousand folds. However, the imbibing agent remains in the particles obtained by the 2-step imbibition seed polymerization method, and another step for removing this imbibing agent is requisite.

Though the seed polymerization method is excellent in that the resin particles in micron order having a sharp particle diameter distribution can be prepared, the foregoing problems prevent the seed polymerization method from being industrially employed.

DISPERSION POLYMERIZATION METHOD

In this method, a polymerizable monomer, an initiator and stabilizer are dissolved in an organic solvent, whereby initiating the polymerization, and the polymer particles insoluble in the organic solvent are made to grow with coalescence the oligomer produced in the first stage of the polymerization as the particle cores.

Though the dispersion polymerization method is excellent for preparing resin particles in micron order having a sharp particle diameter distribution, realization of mass-production by this method is difficult, due to the use of an organic solvent as a medium, which disqualifies the dispersion polymerization method as an industrial method for producing spherical resin particles.

As mentioned above, the particle diameter range of resin particles is limited in the emulsion polymerization method and the suspension polymerization method, and besides, only resin particles having a broad particle diameter distribution can be obtained by these methods. It is possible to obtain resin particles having a sharp particle diameter distribution by the seed polymerization method and the dispersion polymerization method. However, it is in effect impossible to produce spherical resin particles at a low cost, since realization of mass-production by these methods is unavailable.

Moreover, as mentioned above, resin particles produced by the polymerization-granulation methods, i.e., emulsion polymerization, suspension polymerization, seed polymerization and dispersion polymerization, are in most cases limited to vinyl polymers, as is self-evident from the production steps therefor. Thus, the resin particles of the condensation polymers of the present invention cannot be obtained by the "polymerization-granulation" method.

On the other hand, particles of polyester resins, polyamide resins, polyurethane resins and other condensation type resins cannot be formed by a suspension polymerization means. As an alternative means, resins are dissolved in a solvent and this solution is added dropwise to a precipitating agent for solidification, but it is difficult to form substantially spherical particles by this way, and a step for recovering the solvent is required.

SUMMARY OF THE INVENTION

An object of this invention is to provide substantially spherical resin particles comprising, as the main polymer component, a condensation polymer having an optional particle diameter and a narrow particle diameter distribution, and methods for the industrial production thereof.

Another object of the invention is to provide uses of said resin particles.

That is, this invention relates to resin particles comprising a condensation polymer containing an ionic groups as the main component, wherein the average particle diameter (D) ranges from 0.1 to 100 $\mu$m; at least 70% by weight of the particles have a particle diameter between 0.5 and 2.0; and at least 70%, by number average, of the particles have a sphereness (ratio of the short diameter to the long diameter) of not less than 0.7. More preferably, said resin particles comprise an ionic group-containing condensation polymer as the main component, and a counter ionic group containing vinyl addition polymer as the sub-component, still more preferably, the equivalent ratio of the ionic group (B) contained in the vinyl addition polymer to the ionic group (A) contained in the condensation polymer, i.e., B/A, is less than 1.0; and the average particle diameter (D) ranges from 0.1 to 100 $\mu$m.

As the methods for producing the resin particles of the present invention, the following method can be proposed.

(1) The method for producing resin particles, characterized by comprising at least steps of preparing a liquid microdispersion of a condensation polymer capable of microdispersion therein at an average diameter (d) of not more than 1.0 $\mu$m and allowing said micro-dispersed particles to coalesce by keeping the amount of the ions on the surface of the micro-dispersed particles in the dispersion system uniform by addition of compounds having counter ions of electrolytes, whereby producing substantially spherical particles of average diameters ranging from 0.1 to 100 $\mu$m, which comprise a condensation polymer as the main component.

The preferred embodiment of this method is as follows:

(2) In this method, at least the following steps are comprised. That is, an ionic group-containing condensation polymer is dispersed (i.e., microdispersed) in a water dispersion medium containing at least 50% by weight of water, preferably 5–45% by weight, more preferably 10–40% by weight, at an average diameter of not more than 1.0 $\mu$m, preferably 0.5 $\mu$m, and the aforesaid micro-dispersed condensation polymer is coalesced by addition of a monomer containing ionic groups (B') constituting counter ions to the ionic groups (A') contained in said condensation polymer and a polymerizable double bond in the molecular, followed by polymerization of the monomer to produce substantially spherical resin particles of average particle diameters ranging from 0.1 to 100 $\mu$m, preferably 0.5–50 $\mu$m, more preferably 1.0–20 $\mu$m, which comprise the condensation polymer as the main component. The resin particles of the present invention is preferably applied, for example, to toners for electrophotography as the main component thereof.

DETAILED DESCRIPTION OF THE INVENTION

The condensation polymers in this invention are polymers as opposed to the addition polymers produced by cleavage of unsaturated double bonds, which are exemplified by polyester polymers, polyamide polymers, polyimide polymers, polypeptide polymers, polyamino polymers, polycarbonate polymers, polyurethane polymers, natural polymers such as celluloses and chitins, and the like, their derivatives and their modified polymers. Preferable polymers among the before-mentioned polymers are polyester polymers and polyurethane polymers.

The expression "the main component" in the present invention means the component contained in the resin particles in a proportion of not less than 70% by weight, preferably not less than 80% by weight among the components composing the resin particles, and the expression "the sub-component" means the component contained in a proportion of not more than 30% by weight, preferably not more than 20% by weight including 0%.

The gist of this invention lies in obtaining substantially spherical particles in micron order which have a sharp particle diameter distribution, by micro-dispersion of a condensation polymer in a dispersion medium and coalescence of the micro-dispersed particles.

There are known methods which comprise dissolving a polymer uniformly and then precipitating the once-dissolved polymer as micro-particles caused by the change of solubility by pH adjustment, etc. (salting method); methods which comprise dispersing a polymer in the form of the solid microparticles in a liquid medium and making the irregularly-shaped micro-dispersed polymer spherical by warming the entire system to a temperature higher than the softening point of the polymer; and methods which comprise (adding and) mixing a liquid of fluxed (melt) polymer under stirring in the absence or a solvent to make the polymer spherical.

However, limitation of these methods is that it is extremely difficult to produce spherical particles in micron order having a sharp particle diameter distribution industrially in a large amount, since especially in case of condensation polymers, melting points or softening points are high or the solvents to be used need special care, which is disadvantageous in handling.

The state of the "micro-dispersion" in "a liquid", especially in a water medium, in the present invention means the state of dispersion caused by formation of stable micelles resulting from formation of electric bilayer and generally means dispersion in a state of an emulsion, a colloid, or the like. The average diameters of the dispersed particles are preferably not more than 1.0 μm, preferably 0.5 μm.

While there is no special limitation to said condensation polymers capable of micro-dispersion in a liquid, especially in water, examples thereof include condensation polymers having ionic groups, condensation polymers admixed with particular surfactants such as an anionic dispersant, a cationic dispersant or a nonionic dispersant, natural macropolymers such as chitins and celluloses, in which the substitution degree of hydrophobic groups and hydrophilic groups and the molecular weight are controlled. Moreover, solvents and inflating agents may be additionally used to obtain such micro-dispersions.

Preferably, use can be made of condensation polymers containing ionic groups, chitin/chitosan in which the substitution degree of acotamide groups by amine groups is adjusted, carboxymethyl celluloses in which the degree or substitution is adjusted, and the like.

Of these polymers, particularly preferred are condensation polymers containing ionic groups in the molecular.

According to the present invention, by addition of an ionic group (B') having counter ions to the ions of the micro-dispersed condensation polymer (A') to, and addition polymerization of a monomer having polymerizable double bonds in molecules, namely, a vinyl monomer in the dispersion system of the aforesaid micro-dispersed condensation polymer at a temperature not less than 40° C., preferably not more than 100° C., the ions on the surface layer of the micro-dispersed particles are neutralized and the particles coalesce to form spherical particles having the particle diameters in the range of about 0.1–100 μm, which results in surprisingly sharp particle diameter distribution of the particles obtained. The preferable particle diameters can be attained by selecting the reaction conditions. When preferable particle diameters are obtained by particle coalescence, the temperature of the system is lowered to room temperature or a lower temperature (0°–30° C.) and the particles are separated and dried, whereby the objective particles can be efficiently obtained. While the particles obtained according to the present invention can be directly used without classification as mentioned above, classification may be performed when necessary.

There is no particular limitation to the ionic groups in the present invention, and preferable examples thereof include sulfonic acid group ($-SO_3H$), groups of metal salts of sulfonic acid ($-SO_3M$; M=metal), carboxylic acid group ($-COOH$), groups of metal or ammonium salts of carboxylic acid ($-COOX$; X=metal or ammonium), amine group, ammonium group, phosphoric acid group ($-PO_4H_2$), groups of metal or ammonium salts of phosphoric acid ($-PO_4XY$; X,Y=hydrogen, metal or ammonium), acid residues containing phosphorous atom (e.g. $-PO_3H_2$, $-PO_2H_2$, $-POH_2$, $-PO_3XY$ or $-PO_2HX$; X,Y=hydrogen, metal or ammonium), or the like.

The methods for allowing condensation polymers to contain aforesaid ionic groups for micro-dispersion include methods of adding them as the surfactant, methods of copolymerization with the condensation polymer and methods of adding ionic groups to the modified condensation polymer.

As the surfactants, there can be mentioned, for example, anionic surfactants such as fatty acids represented by RCOOM, alcohol sulfuric acid esters represented by $ROSO_3M$, fatty alcohol phosphoric acid ester salts represented by $ROP(OM)_2$ and alkylarylsulfonic acid salts represented by R—Ar—$SO_3M$; and cationic surfactants such as aliphatic amine salts represented by $R^1N(R^2,R^3).X$ and quaternary ammonium salts represented by $(R^1,R^2, R^3,R^4)N.X$ where M stands for an alkali metal, specifically Na, respectively. As the methods for copolymerization with the condensation polymers, use can be made of, but not limited to, methods comprising forming, for example, polyethyleneterephthalate.isophthalate copolymer in which 5-sodium sulfo-isophthalic acid is copolymerized, polyethylene terephthalate-isophthalate copolymer in which a glycol having a tertiary amine of $HOCH_2CH_2N$ $(CH_2CH_2NR^1R^2)$ $(CH_2CH_2OH)$ (wherein $R^1$ and $R^2$ are hydrogen or methyl) is copolymerized, polyhexamethylene adipate copolymers in which a diamine having a tertiary amine of $H_2N-CH_2CH_2CH_2N$ $(CH_2CH_2CH_2NR^1R^2)$ $CH_2CH_2CH_2NH_2$ (wherein $R^1$ and $R^2$ are as defined above) is copolymerized, known polyurethane copolymers in which a diol or a diamine having a tertiary amine as mentioned above is copolymerized, and the like.

Examples of methods for introducing ionic groups by modification of the condensation polymers include methods of neutralizing carboxyl groups of polyamic acids which are precursors of polyimides with ammonia or an organic base and methods of adding trimellitic anhydride to hydroxyl group at the terminals of the polyesters or copolymers of polyesters, followed by exchanging the carboxyl group subjected to addition with a metal ion or ammonia ion.

To be specific about the polyester polymers which are preferably applied as the condensation polymers in the present invention, both of saturated polyester resins and unsaturated polyester resins can be used as the polyester resins. The polyester resins in this invention include, for example, polyesters composed of dicarboxylic acid resin and glycol components.

As the dicarboxylic acid components, use can be made of, for example, aromatic dicarboxylic acids such as terephthalic acid, isophthalic acid, orthophthalic acid and 1,5-naphthalic acid; aromatic hydroxy carboxylic acids such as p-hydroxybenzoic acid and p-(hydroxyethoxy) benzoic acid; and unsaturated aliphatic dicarboxylic acids and alicyclic dicarboxylic acids such as succinic acids, adipic acid, maleic acid, itaconic acid, hexahydrophthalic acid, tetrahydrophthalic acid; and the like. As the acid components, a small amount of tri- and tetracarboxylic acids such as trimellitic acid, trimesic acid and pyromellitic acid may be contained, if necessary.

As the glycol components, use can be made of, for example, diols such as ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,4-phenylene glycol, ethylene oxide addict of 1,4-phenylene glycol, polyethylene glycol, polypropylene glycol, polytetra methylene glycol; ethylene oxide addict and propylene oxide addict of bisphenol A; ethylene oxide addict and propylene oxide addict of bisphenol A, hydride; and the like.

In addition to the foregoing, there may be contained, if necessary, a small amount of triols and tetraols such as trimethylol ethane, trimethylol propane, glycerine and pentaerythritol. There may be also contained lactone polyester polyols which can be obtained by ring-opening polymerization of lactones such as $\epsilon$-caprolactones, as polyester polyols.

Particularly in case where dye coloring is conducted, polyester resins containing terephthalic acid, isoterephthalic acid and 5-sodium sulfoisophthalic acid are preferably used as the acid components, among other polyester resins.

The "monomers containing counter ionic groups and polymerizable double bonds in molecules" used as the subcomponent in the present invention mean vinyl monomers containing ionic groups opposite to the ionic groups contained in the condensation polymer, the main component (when the ionic groups contained in the condensation polymer are anionic groups, the counter ionic groups are cationic groups and when cationic groups are contained in the condensation polymer, the counter ionic groups are anionic groups).

As for the amount of the counter ionic groups, the equivalent ratio of the amount of the counter ionic groups in the vinyl monomer to that of the ionic groups in the condensation polymer is in the range of not less than 0.5, preferably 0.5–10.0, more preferably 0.8–2.0.

As the vinyl monomers containing cationic groups, there can be mentioned, for example, 2-aminoethyl(meth)acrylate, 2-N,N-dimethylaminoethyl (meth)acrylate, 2-N,N-diethylaminoethyl(meth)acrylate, 2-N,N-dipropylamino(meth)acrylate, 2-N, t-butylaminoethyl(meth)acrylate, 2-(4-morpholino)ethyl(meth)acrylate, 2-vinylpyridine, 4-vinylpyridine, aminostyrene, etc.

As the vinyl monomers containing anionic groups, there can be mentioned, for example, monomers containing carboxyl group such as (meth)acrylic acid, itaconic acid, crotonic acid, maleic acid, fumaric acid or a salt thereof; monomers containing sulfonic acid, group such as styrenesulfonic acid, vinyltoluenesulfonic acid, vinylethylbenzenesulfonic acid, isopropenylbenzenesulfonic acid, vinyloxybenzenesulfonic acid, vinylsulfonic acid, sulfoethyl or sulfopropyl ester of (meth)acrylic acid, and 2-acrylamide-2-methylpropenesulfonic acid or a salt thereof; and monomers containing phosphoric acid group such as azidophosphoxyethyl (meth)acrylate, azido-phosphoxypropyl (meth)acrylate, 3-chloro-2-azidophosphoxypropylmethacrylate, bis(meth)acryloxyethyl phosphate, vinyl phosphate or a salt thereof; and the like.

The polymerized ones of the aforesaid ionic group-containing vinyl monomers are the vinyl polymers, namely, the sub-component in the present invention. The aforementioned monomers are used singly or as a mixture, and the polymers include homopolymers and copolymers.

A combination of an anionic group-containing resin (A) with a cationic monomer is preferable for attaining the object of the present invention. Also, a co-use of a known nonionic monomer as appropriate is acceptable.

By the foregoing steps, there can be industrially produced resin particles having an optional particle diameter (D) within the range from 0.1 to 100 $\mu$m in which not less than 70% of the particles have the particle diameters within the range of 0.5–2.0. The particle diameters can be easily controlled by the equivalent ratio of the amount of the counter ionic groups to the vinyl polymer (B) against the amount of the ionic groups of the resin (A), polymerization temperature, polymerization time and other factors. For example, the resin particles can be magnified by increasing the equivalent ratio within the range between 0.1 and 10, by raising the polymerization temperature, by prolonging the aging time, or by other means. The average particle diameters are preferably 1–30 $\mu$m, most preferably 1–10 $\mu$m.

From the aspect of industrial polymerization conditions or the vinyl monomer (b), the resins (A) having Tg within the range from 30° to 90° C. are desirable, and in terms of improvement of the sphereness of the particles and shortening of the aging time, the polymerization temperature is desirably set to Tg+10° C. or higher. By this way, there can be formed resin particles in which not less than 70%, by number average, of the particles have a sphereness of not less than 0.7. The sphereness is preferably 0.8, more preferably 0.9.

There is no special limitation to the initiators usable for polymerizing the vinyl monomers (b), and examples thereof include, for example, organic peroxides such as benzoyl peroxide and acetyl peroxide; azo compounds such as 2,2'-azobisisobutylonitrile and 2,2'-azobis(2,4-dimethylvaleronitrile); inorganic peroxides such as persulfates, hydrogen peroxide salts and permanganates; and water soluble redox initiators such as combinations of the aforesaid inorganic peroxides with reductants such as sulfites, bisulfites, metasulfite, hydrosulfite, thiosulfate, iron salts, and oxalic acid. From the viewpoint of safety and industrial feasibility, water soluble redox initiators are desirable. The amount of the polymerization initiators to be used ranges in general from 0.1 to 3% by weight relative to the amount of the vinyl monomers (b).

By using solvents and plasticizers for the resin (A) additionally, it is possible to lower the apparent Tg (or minimum membrane-forming temperature) of the resin (A) and thus polimerize at a temperature higher than the temperature mentioned above. There is no limitation to the solvents and plasticizers to be used as long as they do not interfere with the polymerization, and suitable ones are selected from those known depending on the species of the resin (A).

While other polymerization conditions can be adopted in accordance with conventional methods, the step of adding the vinyl monomer (b) to an aqueous dispersion of the microparticles of the resin (A) in advance, followed by dropwise addition of a polymerization initiator is preferable in that it involves no rapid coalescence and aggregation of the microparticles of the resin (A).

The thus-obtained aqueous dispersion of the resin particles can be formulated into dried powders in accordance with conventional methods such as filtration, lyophilization and spray drying.

The above-mentioned methods of adding the counter ion-containing vinyl monomer to the system of microdispersion of the ionic group-containing condensation polymer, followed by polymerization work successfully due to the following mechanisms, while some aspects are left unclarified.

That is, the ionic groups of the ionic group-containing polymer dissociate and form stable micelles covered with electric bilayer, whereby an aqueous micro-dispersion is formed.

Though the polymerizable monomer containing the counter ionic group to the ion contained in the polymer exists in the system in dissolution in water, it fails to form a salt with the ionic group (in dissociation) of the polymer. However, once the counter ionic group-containing polymerizable monomer polymerizes, the ionic groups of the polymer are covered by the polyion complex. Since the polymerization proceeds extremely slowly, covering of the ionic groups occurs partially on the individual surface of the micro-dispersed particles. The micro-dispersed particles which have partially lost the electric bilayer become unstable and coalesce with other particles also having lost the electric bilayer partially, whereby wrapping inside the unstabilized surface thereof and reducing the total surface area by the coalescence, which results in re-stabilization of the particles. As mild polymerization proceeds in the system, the system remains extremely uniform macroscopically. Therefore, coalescence of particles occurs with even probability, and thus, the particle diameter distribution of the particles obtained is extremely sharp.

Examples of other concrete methods for producing the resin particles of the present invention include methods of mildly decomposing a compound which produces an acid or an alkali in an aqueous micro-dispersion of the condensation polymer having ionic groups, the dissociation of which can be controlled by changing the pH.

As the compounds which produce an acid or an alkali through decomposition, there can be mentioned, for example, peroxodisulfates (persulfates) and bicarbonates which can be decomposed by heating and triazines which can be decomposed by light radiation.

Among the peroxodisulfates, alkali metal salts and ammonium salts are preferably used. Among the bicarbonates also, alkali metal salts and ammonium salts are preferably used.

The peroxodisulfates and the bicarbonates can be gradually decomposed by heating an aqueous solution thereof at 40° C. or higher, and the former changes the pH of the solution to acidic and the latter changes the pH of the solution to alkaline.

As mentioned above, the polymer having ionic groups forms micelles stabilized by electric bilayer resulting from dissociation of the other ionic groups therein, whereby forming an aqueous micro-dispersion. If the state of dissociation of the ionic groups is changed to the state of non-dissociation by adjusting the pH or the temperature, or both, while the entire system is kept homogeneous, the stable micro-dispersion becomes slightly unstabilized, which gives rise to mild cohesion of particles.

If homogeneity of the system (microscopically) is maintained, coalescence of particles occurs in equal probability, and the obtained particle diameter distribution becomes extremely sharp. The adjustment of pH while the homogeneity of the system is maintained is impossible by conventional methods such that an acid or an alkali is added to the system, followed by mixing. This method, while based on the principle of salting, is characterized in that the homogeneity of the system is maintained.

As other concrete methods for producing resin particles of the present invention, there can be mentioned, for example, a method in which the ionic groups are cleaved by heating of the aqueous micro-dispersion of the condensation polymer having sulfonic acid group, group of metal salts of sulfonic acid, carboxylic acid group, group of metal or ammonium salts of carboxylic acid, amine group, ammonium group, phosphoric acid group, group of metal or ammonium salts of phosphoric acid, whereby the micro-dispersion is unstabilized, resulting in coalescence and granulation of particles. The heating is preferably conducted with the pH of the aqueous micro-dispersion being 7.0 or above. As the method for making the pH 7.0 or above, there can be mentioned a method wherein NaOH, $Na_2CO_3$, KOH, $K_2CO_3$, ammonia, ammonium compounds of cation group-containing water-soluble compounds, etc. are added to an aqueous micro-dispersion, with preference given to a method wherein ammonia or ammonium compounds are added.

As other concrete methods for producing resin particles of the present invention, there can be mentioned, for example, a method in which the ionic groups are cleaved by light-irradiation of the aqueous micro-dispersion of the condensation polymer having phosphoric acid group, sulfonic acid group, carbonic acid group or hydroxy amino group, whereby the micro-dispersion is unstabilized, resulting in coalescence and granulation of particles.

An embodiment of the present invention includes the process wherein the resin particles obtained in accordance with the present invention are separated from the liquid medium, and dried by a specially devised drying process for affording perfectly dried particles. Such specially devised drying processes include rapidly elevating the temperature in the same manner as in hitherto-known methods for ballooning microparticles thermally expandable, to obtain hollow spherical particles having substantial specific gravity of 0.1–1.2. Alternatively, hollow particles of the present invention with thermal expansion suppressed by a slight degree may be immersed in a blowing agent, so that the blowing agent is contained mainly in the hollow space thereof to make thermally expandable micro-particles.

Another embodiment of the present invention involves the process wherein a small amount of an amphoteric polar solvent is added to an aqueous dispersion of the resin particles comprising the condensation polymer of the present invention as the main component, followed by stirring; the temperature is elevated to 70°–100° C. and thereafter rapidly cooled to give porous particles; and the particles obtained are separated from the medium and dried under usual (mild) conditions to yield substantially spherical porous resin particles (comprising particles of a sphereness of not less than 0.7 in a proportion of 70% by number average) having substantial specific gravity of 0.1–1.2 and a sharp particle diameter distribution.

Still another embodiment of the present invention involves the process wherein after an aqueous dispersion of the resin particles comprising the condensation polymer of the present invention as the main component has been kept at 70°-100° C. at a pH not more than 7 for a long time, it is cooled and dried to yield potato-shaped particles having a number of convexes and concaves (craters or dimples) of not more than 0.1 Do wherein Do means the average particle diameter, on the particle surface.

The resin particles of the present invention are particularly useful as toners for electrophotography, such as toners used as the photographic developer for eletrophotographic copiers, laser printer, etc. The present invention thus also provides toners for electrophotography.

The methods for coloring the toners for electrophotography of the present invention are not particularly limited, and conventionally available pigments, dyes or carbon blacks known per se can be used. Specifically from the viewpoint of spectral transmission characteristics, dyes are preferred.

As the pigments, there can be used lake pigments, rhodamine pigments, quinacridone pigments, anthraquinone pigments, monoazo pigments, disazo pigments, phthalocyanine pigments and the like.

Particularly, anthraquinone pigments and disazo pigments are preferred as the yellow pigments. Disazo pigments having benzidine as the basic skeleton are further preferable. Concrete examples of the disazo yellow pigments having benzidine as the basic skeleton include C.I. pigment yellow 12,
C.I. pigment yellow 13,
C.I. pigment yellow 14,
C.I. pigment yellow 15,
C.I. pigment yellow 16,
C.I. pigment yellow 17,
C.I. pigment yellow 63,
C.I. pigment yellow 77, and the like.

Especially, anthraquinone pigments and quinacridone pigments are preferred as the magenta pigments. Examples of such quinacridone pigments include C.I. pigment violet 19,
C.I. pigment violet 30,
C.I. pigment red 122, and the like.

Especially, phthalocyanine pigments are preferred as the cyan pigments. Examples of such phthalocyanine pigments include C.I. pigment blue 15,
C.I. pigment blue 15:1,
C.I. pigment blue 15:2,
C.I. pigment blue 15:3,
C.I. pigment blue 15:4,
C.I. pigment blue 16,
C.I. pigment blue 17,
C.I. pigment blue 17:1,
C.I. pigment green 7,
C.I. pigment green 13,
C.I. pigment green 25,
C.I. pigment green 36,
C.I. pigment green 37, and the like.

The amount of the pigments to be contained is 0.1–25% by weight. As the methods for incorporating and dispersing the pigments in the resin particles, there can be mentioned, inter alia, methods of incorporating the pigments by kneading in the resin in advance, methods of co-dispersing the pigments in the aqueous dispersion in the course of coalescence and growth of microparticles, to permit the pigments to be incorporated in the particles concurrently with the coalescence of the microparticles, methods of coating the pigments mechanically on the particle surface after granulation, and other methods, which are not limitative.

As the dyes, there may be used disperse dyes, vat dyes, metallized dyes, acidic dyes, basic dyes, cation dyes, reactive dyes, and the like. Dispersion dyes and cation dyes are preferably used.

As the carbon blacks, there can be used thermal black, acetylene black, channel black, furnace black, lamp black, and the like. The amount of the carbon blacks to be contained is 0.1–25% by weight.

In the present invention, the carbon blacks can be used singly or, if necessary, in combination. If necessary, other coloring agents such as pigments and dyes can be additionally used.

The carbon blacks can be, for example, absorbed by particles, covered with particles or hit mechanically into the particle surface, for example, by dry process. As the methods for producing carbon black-containing particles with the carbon blacks dispersed in particles, there can be mentioned, for example, methods of dispersing carbon blacks in particles, followed by granulation and methods of permitting the carbon blacks to be incorporated in the particles during coalescence and granulation by allowing an aqueous dispersion of the carbon blacks to coexist in granulation.

In the present invention, silica micropowders can be contained for controlling surface characteristics, flowability and electrification characteristics. Such silica micropowders exist preferably in the surface layers of toners or in the vicinity of the surface layer.

More specifically, it is preferable that silica micropowders attach to the surface layers of the polyester resin, cover the surface layers or are partly imbedded in the surface of the polyester particles.

Preferably, the silica microparticles cover not less than 25%, more desirably not less than 40% of the surface of the polyester particles, and are partly imbedded in the polyester particle surface.

The silica microparticles are preferably incorporated in such a way that the amount of silica contained in the area of 0.05 D in depth from the particle surface wherein D means the average particle diameter of the polyester particles is not less than 10% by weight. The silica micropowders to be used in the present invention have preferably an average particle diameter of not more than 1 $\mu$m the preferably spherical. These silica micropowders can be adsorbed in the particles, for example, by wet or dry method or anchored after adsorption.

In the present invention, electrical charge controlling agents can be used in ease where friction-electrification characteristics need control. As such electrical charge controlling agents, there can be used pigments, resin particles having an average particle diameter of not more than 2$\mu$ and inorganic particles.

As the pigment type electrical charge controlling agents capable of giving positive electrical charge to toners by friction with earlier particles, there can be mentioned, for example, Ca, Ba and other metal titanates or carbonates, alkoxy amines, polyamide resins such as nylons, pigments having positive zeta potential exemplified by phthalocyanine blue, quinacridone red and azo metal complex green, azine compounds, azine compounds modified by stearic acid, azine compounds modified by oleic acid, azine pigments such as nigrosin and quaternary ammonium compounds.

As the pigment type electrical charge controlling agents capable of giving negative charge to toners through friction with earlier particles, there may be mentioned, for example, carbon blacks, pigments having negative zeta potential such as halogenophthalocyanine green, flavanthrone yellow and perylene red, metallized azo compounds of copper, zinc, lead, iron, etc.

As the resin particles having an average particle diameter of not more than $2\mu$, there can be mentioned, for example, polyamide resins such as nylons, urethane resins and polymethyl methacrylate resins.

As the inorganic particles, there can be used micro powders of minerals such as talc, mica, kaolin and clay, and micropowders of metal oxides such as silica, titanium oxide, magnesia, calcia and alumina.

The electrical charge controlling agents exist preferably at least in the surface layers or in the vicinity of the surface layers of toners. More specifically, it is preferable that these agents be incorporated in a coating on the surface layers of the polyester particles or imbedded in the surface layer.

While the electrical charge controlling agents can be adsorbed in the particles, for example, by wet or dry methods, or anchored after adsorption, the methods of treating the particles with these agents by a mechanofusion method, a dry method, are preferable.

In the present invention, the resin particles may be covered with a thermoplastic polymer of the constituent component different from that with the condensation polymer as the main constituent component, for controlling surface characteristics, flowability and electrification characteristics of the particles. Preferably, not less than 30% by weight of the thermoplastic resins are contained in the area of 0.05D in depth from the surface of the resin particles wherein D means the average particle diameter of the resin particles.

As the thermoplastic resins, there can be used polymers such as polyethylene resins, vinyl chloride resins, polypropylene resins, rubbers, nylon resins, urethane resins, acryl resins, polymethyl methacrylate resins, fluorine resins and silicon resins. The preferred resins in the present invention are urethane resins and resins containing methacrylate as the main component.

There is no particular limitation imposed on the methods for covering the surface of the resin particles with the thermoplastic resins, and conventionally-known treatment methods can be used, whether they are wet methods or dry methods.

In the present invention, magnetic powders can be contained in the resin particles if it is necessary to impart the resin particles with magnetism. As the magnetic powders, there can be used, for example, iron, cobalt, nickel or their alloys comprising those as the main element, or oxides of magnesium or ferrite, or the like. Particularly, magnetic powders of oxides with ferrite as the main element are preferably used. These may be used singly or as a mixture. These magnetic powders may be, if necessary, treated with silane coupling agents, titanate coupling agents, phosphoric acid coupling agents, surfactants, and the like. The amount of the magnetic powders to be contained is preferably 10–70% by weight, more preferably 15–50% by weight.

EXAMPLES

Hereafter the present invention is described in further detail by the following examples, which are not limitative to the scope of the invention.

"Part" and "percentage" shown in the following examples are by weight unless specified otherwise. The average particle diameters were measured by an automatic particle diameter distribution measuring apparatus type CAPA700 manufactured by Shimazu Corporation, and the sphereness was decided by measuring long diameters and short diameters from the projected images by an optical microscope and taking the ratio of the short diameter to the long diameter. The particles having a sphereness of 1.0 are regarded as true spheres, and below 1.0 as deformed spheres. The molecular weights were measured by a molecular weight measuring apparatus type 115 manufactured by Hitachi, Ltd., and the particle diameters of the dispersions were measured by a grind meter and an optical microscope.

In Examples 12–14 and Comparative Example 3, the resins and the resin particles used have the following physical properties:
Melting point and glass transition point:
  measured with the temperature raising rate at 10° C./minute by the differential scanning calorimeter (manufactured by Shimazu Corporation).
Softening point:
  measured in accordance with JIS K2351.
Number average molecular weight (steam pressure method):
  measured by the molecular weight-measuring apparatus (manufactured by Hitachi, Ltd.)
Average particle diameter:
  measured by the automatic particle diameter distribution-measuring apparatus type CAPA700 manufactured by Shimazu Corporation.
Sphereness:
  calculated as the ratio of the short diameter to the long diameter measured from the projected image of the sphere with the use of optical microscopes; 1.0 being a true sphere and below 1.0 being a deformed sphere.

EXAMPLES 1–5 AND COMPARATIVE EXAMPLES 1–2

Production of aqueous dispersions of polyester resin particles

The reactor was charged with 95 parts of dimethyl terephthalate, 95 parts of dimethyl isoterephthalate, 68 parts of ethylene glycol, 114 parts of neopentyl glycol and 0.1 part of zinc acetate, and ester interchange reaction was conducted at 140° C.–220° C. for 3 hours, followed by addition of 5.4 parts of 5-sodium sulfoisophthalic acid and further 1 hour's ester interchange reaction at 220°–260° C. Thereafter, 1 hour's polycondensation reaction was conducted under reduced pressure (10–0.2 mmHg) at 200°–260° C. to afford a polyester resin having the molecular weight of 2700 and Tg of 55° C. (sodium sulfonate base amount: 104 equivalent/$10^6$ g) as (A) resin.

After the mixture of 34 parts of the obtained polyester resin and 10 parts of butyl cellusolve was stirred at 100° C., 56 parts of water at 80° C. was added to give an aqueous dispersion (I) of the polyester having the average particle diameter of $0.1\mu$.

After 1000 parts of the aqueous dispersion (I) was put in a distilling flask, distillation was conducted until the fraction temperature became 100° C., followed by cooling and addition of 250 parts of deionized water, to give the aqueous dispersion (II) with 34% by weight solid.

Production of resin particles and evaluation thereof

In a four-mouthed 1 l-separable flask equipped with a thermometer, a condenser and a stirrer were put 834 parts of the aqueous dispersion (I), 35 parts of deionized water and the cationic monomer (b) as shown in Table 1, and the temperature was raised to the polymerization temperature as shown in Table 1, respectively. After 100 parts of an aqueous solution containing 0.2 part of ammonium persulfate was added over 40 minutes, polymerization was conducted and the reaction mixture was kept at said temperature for the aging time as shown in Table 1. The dispersion was subjected to spray drying to give resin particles. The evaluation results of the shape, particle diameter, and the like of the particles are also shown in Table 1.

From Table 1, it is evident that the spherical resin particles having a narrow particle diameter distribution and an optional average particle diameter can be obtained by controlling the equivalent amount of the cationic groups, the polymerization temperature and the aging time.

EXAMPLE 7

In a four-mouthed 1 l-separable flask equipped with a thermometer, a condenser and a stirrer were put 250 parts by weight (with 34% by weight solid) of the aqueous dispersion (I) of the copolyester as obtained in Example 1 and 1.2 parts by weight of dimethylamine, and the temperature was raised to 70° C. under stirring, whereby the copolymer having a particle diameter in submicron order existing in the aqueous dispersion of the copolyester grew in size, and there were produced the polyester particles having the average particle diameter D of 5.2 μm in which the occupation percentage (by weight) of the particles having a particle diameter ranging from 0.5D to 2.0D was 89% and the occupation percentage (by number) of the particles having a sphereness of not less than 0.7 was 95%.

EXAMPLE 8

In a four-mouthed 1 l-separable flask equipped with a thermometer, a condenser and a stirrer were put 250 parts by weight (with 34% by weight solid) of the aqueous dispersion (I) of the copolyester as obtained in Example 1 and 8 parts by weight of acrylic acid/sodium styrenesulfonate copolymer, and the temperature was raised to 70° C. under stirring. Thereto was added dropwise over 40 minutes 26 parts by weight of deionized water with 1.55 parts by weight of sodium chloride dissolved therein, and the mixture was stirred at 70° C. for 180 minutes. Thereby the particles of the copolymer having a particle diameter in submicron order existing in the aqueous dispersion of the copolyester grew in size, and there were obtained the polyester particles having the average particle diameter D of 6.5 μm in which the occupation percentage (by weight) of the particles having a particle diameter ranging from 0.5D to 2.0D was 89% and the occupation percentage (by number) of the particles having a sphereness of not less than 0.7 was 95%.

TABLE 1

| | The present invention | | | | | Comparative Examples | |
|---|---|---|---|---|---|---|---|
| | 1 | 2 | 3 | 4 | 5 | 1 | 2 |
| Species of aqueous dispersion | I | I | I | I | II | I | II |
| Species of monomer (b) | DAM | DAM | DAM | DAM/MMA | DAM | DAM | MMA |
| Amount of monomer (b) (part) | 13 | 26 | 26 | 16/24 | 13 | 13 | 100 |
| Equivalent ratio of cation/anion | 2.8 | 5.6 | 5.6 | 3.5 | 2.8 | 2.8 | * |
| Polymerization temperatue (°C.) | 70 | 70 | 80 | 80 | 80 | 15 | 80 |
| Aging time (min.) | 60 | 90 | 90 | 120 | 240 | 240 | 240 |
| Average particle diameter (D: μm) | 7.6 | 28.6 | 45.5 | 98 | 7.0 | 0.1 | 0.1 |
| Occupation percentage of particles of 0.5 D–2.0 D (%) | 90 | 87 | 91 | 85 | 91 | — | — |
| Occupation percentage of particles having sphereness of not less than 0.7 (%) | 90 | 86 | 84 | 82 | 96 | — | — |

Note:
(—) means that no microspheres were obtained
*: Free from cationic group
DAM: Dimethylaminoethyl methacrylate
MMA: Methyl methacrylate

EXAMPLE 6

In a four-mouthed 1 l-separable flask equipped with a thermometer, a condenser and a stirrer was put 250 parts by weight (with 34% by weight solid) of the aqueous dispersion (I) of the copolyester as obtained in Example 1, and the temperature of the mixture was raised to 70° C. while stirring. Thereto was added dropwise over 40 minutes 26 parts by weight of deionized water with 1.2 parts by weight of dimethylamine dissolved therein, and the mixture was stirred at 70° C. for 180 minutes, whereby the particles of the copolymer having a particle diameter in submicron order occurring in the aqueous dispersion thereof grew to yield the polyester particles having the average particle diameter D of 5.2 μm in which the occupation percentage (by weight) of the particles having a particle diameter ranging from 0.5D to 2.0D was 89% and the occupation percentage (by number) of the particles having a sphereness of not less than 0.7 was 95%.

EXAMPLE 9

In a four-mouthed 1 l-separable flask equipped with a thermometer, a condenser and a stirrer were put 250 parts by weight (with 34% by weight solid) of the aqueous dispersion (I) of the copolyester as obtained in Example 1 and 8 parts by weight of formalin condensate of sodium naphthalene sulfate, and the temperature was raised to 70° C. under stirring. Thereto was added dropwise over 40 minutes 26 parts by weight of deionized water with 1.55 parts by weight of sodium chloride dissolved therein, followed by 180 minutes' stirring at 70° C. Thereby the particles of the copolymer having a particle diameter in submicron order existing in the aqueous dispersion of the copolyester grew in size, and there were obtained the polyester particles having the average particle diameter D of 6.5 μm in which the occupation percentage (by weight) of the particles having a particle diameter ranging from 0.5D to 2.0D was 84% and the occupation percentage (by number) of the particles having a sphereness of not less than 0.7 was 95%.

EXAMPLE 10

In a four-mouthed 1 l-separable flask equipped with a thermometer, a condenser and a stirrer was put 250 parts by weight (with 34% by weight solid) of the aqueous dispersion (I) of the copolyester as obtained in Example 1, and the temperature was raised to 70° C. under stirring. Thereto was added dropwise over 40 minutes 26 parts by weight of deionized water with 1.55 parts by weight of sodium chloride dissolved therein, followed by 180 minutes' stirring at 70° C. Thereby the particles of the copolymer having a particle diameter in submicron order existing in the aqueous dispersion of the copolyester grew in size, and there were obtained the polyester particles having the average particle diameter D of 4.8 μm in which the occupation percentage (by weight) of the particles having a particle diameter ranging from 0.5D to 2.0D was 72% and the occupation percentage (by number) of the particles having a sphereness of not less than 0.7 was 98%.

EXAMPLE 11

① Preparation of polyester polyol

In an autoclave equipped with a thermometer and a stirrer were put 392 parts by weight of dimethyl terephthalate, 392 parts by weight of dimethyl isophthalate, 310 parts by weight of ethylene glycol and 520 parts by weight of neopentyl glycol, and the mixture was reacted by heating at 200° C. under stirring for 360 minutes until the methanol fraction became 252 parts by weight. Thereafter, the reaction mixture was cooled to 120° C., and 292 parts by weight of adipic acid was added. After the temperature was again raised to 200° C., the mixture was reacted for 480 minutes to afford the polyester polyol.

② Urethanation and preparation of aqueous dispersion of polyurethane

Dehydration of 100 parts by weight of the obtained polyester polyol was conducted at 120° C. under reduced pressure, and the product was cooled to 80° C., followed by addition of 100 parts by weight of methyl ethyl ketone and stirring of the mixture for dissolution. Thereafter, 65.3 parts by weight of tolylene 2,4-diisocyanate and 17.7 parts by weight of 2,2-dimethylol propionate as a chain extender were added, and the mixture was reacted at 70° C. for 10 hours. After completion of the reaction, the reaction mixture was cooled to 40° C., and 12.3 parts by weight of piperazine and 13.3 parts by weight of triethylamine were added for chain extension and neutralization, followed by addition of 500 parts by weight of water under stirring to afford the aqueous dispersion of polyurethane.

③ Production of polyurethane particles

In a four-mouthed 5 g-separable flask equipped with a thermometer, a condenser and a stirrer were put 800 parts by weight of the obtained aqueous dispersion of the polyurethane, 800 parts by weight of deionized water and 25 parts by weight of dimethylaminoethyl methacrylate, and the temperature was raised to 70° C. After 100 parts by weight of an aqueous solution containing 0.2 part by weight of ammonium persulfate was added dropwise over 30 minutes, the mixture was reacted at 70° C. for further 20 minutes. Thereby, the micro-dispersed particles having a particle diameter in submicron order existing in the aqueous dispersion of the polyurethane coalesced and grew in size to yield the polyurethane particles having the average particle diameter D of 7.5 μm in which the occupation percentage (by weight) of the particles having a particle diameter ranging from 0.5D to 2.0 D was 92% and the occupation percentage (by number) of the particles having a sphereness of not less than 0.7 was 95%.

EXAMPLE 12

In an autoclave equipped with a thermometer and a stirrer were put 94 parts by weight of dimethyl terephthalate, 95 parts by weight of dimethyl isophthalate, 89 parts by weight of ethylene glycol, 80 parts by weight of neopentyl glycol and 0.1 part by weight of zinc acetate, and ester interchange reaction was conducted by heating at 120°–230° C. for 120 minutes. Thereto was added 6.7 parts by weight of 5-sodium sulfoisophthalic acid, and the mixture was reacted at 220°–230° C. for 60 minutes. After the temperature was raised to 250° C., the reaction was conducted with the system pressure reduced to 1–10 mmHg for 60 minutes to give the copolyester (A1).

The obtained copolyester (A1) had the molecular weight of 2700 and the amount of the sulfonic acid metal salt group was 118 equivalent/1000000 g. The amount of the sulfonic acid metal salt group was decided by measuring the concentration of sulfur of the copolyester. From the results of NMR analysis, the copolyester (A1) contained 48.5 mol % of terephthalic acid, 49.0 mol % of isophthalic acid and 2.5 mol % of 5-sodium sulfoisophthalic acid as the acid component, and 61.0 mol % of ethylene glycol and 39.0 mol % of neopentyl glycol as the glycol component.

In a four-mouthed 1 l-separable flask equipped with a thermometer, a condenser and a stirrer were put 34 parts by weight of the obtained copolymer polyester (A1) and 10 parts by weight of butyl cellusolve, and the mixture was dissolved at 110° C., whereafter 56 parts by weight of water at 80° C. was added to give the aqueous dispersion of the copolymer polyester (B1).

In a four-mouthed 1 l-separable flask equipped with a thermometer, condenser and a stirrer were put 834 parts by weight of the aqueous dispersion of the copolymer polyester (B1), 35 parts by weight of deionized water and 5.6 parts by weight of dimethylaminoethyl methacrylate, and the temperature was raised to 70° C. After 100 parts by weight of an aqueous solution containing 0.2 part by weight of ammonium persulfate was added dropwise over 40 minutes, the mixture was reacted at 70° C. for 60 minutes. Thereby, the particles of the copolymer having a particle diameter in submicron order existing in the aqueous dispersion of the copolymer polyester grew in size to yield the polyester particles (C1) having the average particle diameter D of 8.7 μm in which the occupation percentage (by number) of the particles having a particle diameter ranging from 0.5D to 2.0D was 92% and the occupation percentage of the particles having a sphereness of not less than 0.7 was 89% by number average.

By adding water to the obtained polyester particles (C1), 20% by weight of the aqueous dispersion of the polyester particles (D1) was obtained.

To 500 parts by weight of the obtained aqueous dispersion of the polyester particle (D1) was added a dispersion of 10 parts by weight of Sumikaron.yellow SE-5G (C.I. disperse yellow 5), a disperse dye manufactured by Sumitomo Chemical Co., Ltd., in 100 parts by weight of water, and the mixture was heated at 130° C. under stirring and kept standing still for 60 minutes. Thereafter, cooling, filtration and washing were conducted, followed by spray drying to afford the yellow toner (E1Y).

In the same manner, the magenta toner (E1M) and the cyan toner (E1C) were obtained from the dispersion of the polyester particles (D1) with the use of Sumikaron.red E-FBL (C.I. disperse.red 60) and Sumikaron.blue E-FBL (C. I. disperse.blue 56), a disperse dye manufactured by Sumitomo Chemical Co., Ltd.

The obtained color toners, respectively in the amount of 5 parts by weight, were mixed with 95 parts by weight of carrier (spherical reduced iron powders having the average particle diameter of 80 $\mu$m) to yield two-component developing agents for electrophotography.

The electrification of the toners after mixing with carriers were as follows:

(E1Y)-75 $\mu$C/g
(E1M)-68 $\mu$C/g
(E1C)-60 $\mu$C/g

Using said developing agents, consecutive copies on 5000 sheets of paper were made by an electrophotographic color copier with an amorphous silicon as the photosensitive material. The obtained copies were free from thin spots or fogs, showing clear and fine images.

Using the developing agents, copies on transparent films for overhead projectors were made in the same manner. The obtained copies were excellent in spectral transmittance, and the images projected on the screen by the overhead projection were free from turbidity and showed clear color tone.

There were not found any particular problems in humidity-dependency in electrification characteristics, flowability and insulation capability, fixing characteristics, sharpmelt characteristics, offset resistance and other characteristics.

EXAMPLE 13

In an autoclave equipped with a thermometer and a stirrer were placed 815 parts by weight of dimethylterephthalate, 320 parts by weight of dimethyl isophthalate, 491 parts by weight of ethylene glycol, 549 parts by weight of neopentyl glycol and 0.6 part by weight of zinc acetate, and ester interchange reaction was conducted by heating at 180°–230° C. for 120 minutes, followed by addition of 40 parts by weight of 5-sodium sulfoisophthalic acid. The mixture was reacted at 220°–230° C. for 60 minutes, and then the temperature was raised to 250° C. Thereafter, the reaction was continued with the pressure of the system reduced to 1–10 mmHg, to give the copolyester (A2).

The obtained copolyester (A2) had the molecular weight of 2500 and the amount of the sulfonic acid metal salt groups was 116 equivalent/1000000 g, which was calculated by measuring the concentration of sulfur of the copolymer polyester. From the results of NMR analysis, the copolyester (A2) contained

| terephthalic acid | 70.0 mol %, |
| isophthalic acid | 27.5 mol % and |
| 5-sodiumsulfoisophthalic acid | 2.5 mol % as the acid |
| component and | |
| ethylene glycol | 48.0 mol % and |
| neopentyl glycol | 52.0 mol % as the |
| alcohol component. | |

Roughly pulverized pieces of 100 parts by weight of the obtained copolyester (A2) and 5 parts by weight of azo yellow pigments were mixed and pulverized in a ball mill. Then, the mixture was fluxed in a roll mill to yield the colored copolyester (A2Y).

In a four-mouthed 1 -separable flask equipped with a thermometer, a condenser and a stirrer, 34 parts by weight of the obtained colored copolyester (A2Y) and 10 parts by weight of butyl cellusolve were fluxed at 110° C., whereafter 56 parts by weight of water at 80° C. was added to give the aqueous dispersion of the colored copolycster (B2Y).

In a four-mouthed 1l-separable flask equipped with a thermometer, a condenser and a stirrer were put 834 parts by weight of the aqueous dispersion of the colored copolyester (B2Y), 35 parts by weight of deionized water and 5.6 parts by weight of dimethylaminoethyl methacrylate, and the temperature was raised to 70° C. After 100 parts by weight of an aqueous solution containing 0.2 part by weight of ammonium persulfate was added dropwise thereto over 40 minutes, the reaction was conducted at 70° C. for further 60 minutes. Thereby, the particles of the copolymer of a particle diameter in submicron order existing in the aqueous dispersion of the colored copolymer polyester grew in size to yield the polyester particles (C2Y) having the average particle diameter D of 6.7 $\mu$m in which the occupation percentage by number average of the particles having a sphereness of not less than 0.7 was 85% and the occupation percentage (by number) of the particles having a particle diameter ranging 0.5D to 2.0D was 92%.

Subsequent cooling, filtration, washing and spray drying afforded the yellow polyester particles (D2Y). In the same manner, with the use of a rhoddamine red pigment and a phthalocyanine blue pigment, the magenta polyester particles (D2M) and the cyan polyester particles (D2C) were obtained respectively.

By the Hosokawa's atomizer, 100 parts by weight of the obtained yellow polyester particles (D2Y) and 5 parts by weight of acryl micropowders MP-1000 (manufactured by Soken Kagaku, Ltd.) were admixed, and by coating silica micropowders on the surface of the polyester particles, the yellow toner (T2Y) was obtained. In the same manner, the magenta toner (T2M) and the cyan toner (T2C) were obtained.

The obtained colored toners respectively in the amount of 5 parts by weight were mixed with 95 parts by weight of carrier (spherical reduced iron powders having the average particle diameter of 80 $\mu$m), to yield the two-component developing agents for electrophotography. The electrification amount of the toners after mixing with the carrier were respectively as follows:

(T2Y)-99 $\mu$C/g
(T2Y)-87 $\mu$C/g
(T2Y)-93 $\mu$C/g:

Using the obtained developing agents, consecutive copies on 5000 sheets of paper were made by an electrophotographic copier with an amorphous silicon used as the photosensitive material. The obtained copies were free from thin spots or fogs, showing clear and excellent images.

There were not found any particular problems in respect of humidity-dependency of electrification characteristics, flowability and insulation characteristics; sharpmelt characteristics; offset resistance and other characteristics.

COMPARATIVE EXAMPLE 3

By mixing 90 parts by weight of the copolyester (A2) as obtained in Example 10 with 10 parts by weight of an azo yellow pigment, a rhodamine red pigment or a phthalocyanine blue pigment in a ball mill respectively in advance, fluxing the mixture in a roll mill, pulverising by an atomizer and classifying, the colored polyester particles (D5Y), (D5M), (D5C) having the average particle diameter of 11 $\mu$m were obtained respectively.

By mixing 100 parts by weight of the obtained colored polyester particles and 5 parts by weight of acryl micropowders MP-1000 (Soken Chemical, Ltd.) and coating silica micropowders on the surface of the polyester particles by a mechanofusion means by the Hosokawa's atomizer, the yellow toner (T5Y), the magenta toner (T5M) and the cyan toner (T5C) were obtained.

In the same manner as in Examples, the obtained color toners respectively in the amount of 5 parts by weight were mixed with 95 parts by weight of a carrier (spherical reduced iron powders having the average particle diameter of 80 $\mu$m) to give the two-component developing agents for electrophotography.

The electrification amounts of the toners after mixing with the carrier were respectively as follows:

(T5Y)-34 $\mu$C/g
(T5M)-37 $\mu$C/g
(T5C)-29 $\mu$C/g

Using these developing agents, consecutive copies on 5000 sheets of paper were made by an electrophotographic copier with an amorphous silicon used as the photosensitive material therein, in the same manner as in Example 10. The obtained copies included many thin spots in fine lines and failed to show clear images.

EXAMPLE 14

By mixing 100 parts by weight of the roughly pulverized pieces of the copolyester (A1) obtained in Example 9, 5 parts by weight of carbon black and 30 parts by weight of ferrite magnetic powders in a ball mill and pulverizing, followed by fluxing in a roll mill, the copolymer polyester (A4Y) was obtained.

In a four-mouthed 1 l-separable flask equipped with a thermometer, a condenser and a stirrer were put 34 parts by weight of the obtained copolyester (A4Y) and 10 parts by weight of butyl cellusolve, and the mixture was fluxed at 110° C., followed by addition of 56 parts by weight of water at 80° C. to yield the aqueous dispersion of the copolyester (B4Y).

In a four-mouthed 1 l-separable flask equipped with a thermometer, a condenser and a stirrer were put 834 parts by weight of the aqueous dispersion of the colored copolyester (B4Y), 35 parts by weight of deionized water and 5.6 parts by weight of dimethylaminoethyl methacrylate, and the temperature was raised to 70° C. Thereafter, 100 parts by weight of an aqueous solution containing 0.2 part by weight of ammonium persulfate was added dropwise over 40 minutes, and the reaction was continued at 70° C. for another 60 minutes. Thereby, the particles of the copolymer having a particle diameter in submicron order existing in the aqueous dispersion of the colored copolymer polyester grew in size to yield the polyester particles (C4Y) having the average particle diameter D of 6.7 $\mu$m in which the occupation percentage (by number) of the particles having a particle diameter ranging from 0.5D to 2.0D was 92% and the occupation percentage (by number average) of the particles having a sphereness of not less than 0.7 was 92%. Subsequent cooling, filtration, washing and drying in vacuum gave the yellow polyester developing agent (D4Y).

Using these developing agents, consecutive copies on 5000 sheets of paper were made by an electrophotographic laser printer with OPC used as the photosensitive material. The obtained copies were free from thin spots or fogs, showing clear and fine images.

There were not found any particular problems in flowability, fixing characteristics, sharpmelt characteristics, offset resistance and other characteristics.

We claim:

1. Resin particles comprising a condensation polymer containing at least one ionic group as the main component, wherein the condensation polymer is at least 80% by weight of the particles, the average particle diameter (D) ranges from 0.1 to 30 $\mu$m, at least 70% by weight of the particles have a diameter of 0.5D to 2.0D and at least 70% by number average of the particles have a sphereness (ratio of the short diameter to the long diameter) of not less than 0.7.

2. Resin particles as claimed in claim 1 wherein D ranges from 1 to 10 $\mu$m.

3. Resin particles as claimed in claim 1 wherein the amount of the ionic group is not more than 500 eq./1000000 g.

4. Resin particles as claimed in claim 1 and wherein the ionic group is selected from the group consisting of sulfonic acid, metal salts of sulfonic acid, amino, ammonium, carboxylic acid, metal salts of carboxylic acid, ammonium salts of carboxylic acid, and phosphoric acid.

5. Resin particles as claimed in claim 1 comprising an ionic group-containing condensation polymer as the main component and a counter ionic group-containing vinyl addition polymer as the subcomponent, the ratio of the number of equivalents of the counter ionic group (B) contained in the vinyl addition polymer to the number of equivalents of the ionic group (A) contained in the condensation polymer being not less than 0.5, the average particle diameter (D) ranging from 0.1 to 100 $\mu$m and (A) and (B) being counter ions to each other.

6. Resin particles as claimed in claim 5 wherein the ratio of the number of equivalents of B to the number of equivalents of A is 0.5–10.0.

7. Resin particles as claimed in claim 1, wherein the condensation polymer is selected from the group consisting of polyester polymers, polyamide polymers, polyimide polymers and polyurethane polymers.

8. Resin particles as claimed in claim 1, wherein the condensation polymer is a polyester containing not less than 80 mol % of terephthalic acid, isophthalic acid, or a mixture thereof as the acid component.

9. Resin particles as claimed in claim 5 wherein A, B or both are selected from the group consisting of phosphoric acid, amino, ammonium, carboxylic acid and salts of carboxylic acid.

10. Resin particles as claimed in claim 1, which are hollow spherical particles having a specific gravity of from about 0.1 to about 1.2.

11. Resin particles as claimed in claim 1, which are porous particles having a specific gravity of from about 0.1 to about 1.2.

12. Resin particles as claimed in claim 1, wherein at least 70% by weight of the particles have concaves and convexes of not more than 0.1 Do on the particle surface, where Do is the particle diameter.

13. Resin particles as claimed in claim 1, containing 1-25% by weight of pigments.

14. Resin particles as claimed in claim 13, wherein the pigment is selected from the group consisting of disazo yellow pigments having benzidine as the basic skeleton, quinacridone magenta pigments and phthalocyanine pigments.

15. Resin particles as claimed in claim 1, which are colored by dyes.

16. Resin particles as claimed in claim 15, wherein the dyes are disperse dyes and/or solvent dyes and/or vat dyes.

17. Resin particles as claimed in claim 16, wherein the disperse dyes are anthraquinone disperse dyes.

18. The resin particles according to claim 1, wherein the condensation polymer is at least 87% by weight of the particles.

19. The resin particles according to claim 1, wherein at least 85% by weight of the particles have a diameter of 0.5D to 2.0D and at least 82% by number average of the particles have a sphereness (ratio of the short diameter to the long diameter) of not less than 0.7.

20. The resin particles according to claim 1, wherein the average particle diameter (D) ranges from 0.1 to 10 μm.

21. The resin particles according to claim 20, wherein at least 85% by weight of the particles have a diameter of 0.5D to 2.0D.

22. The resin particles according to claim 21, wherein and at least 82% by number average of the particles have a sphereness (ratio of the short diameter to the long diameter) of not less than 0.7.

23. The resin particles according to claim 22, wherein at least 90% by weight of the particles have a diameter of 0.5D to 2.0D and at least 95% by number average of the particles have a sphereness (ratio of the short diameter to the long diameter) of not less than 0.7.

* * * * *

UNITED STATES PATENT AND TRADEMARK OFFICE
CERTIFICATE OF CORRECTION

PATENT NO. : 5,352,521
DATED : October 4, 1994
INVENTOR(S) : Hotta et al.

It is certified that error appears in the above-identified patent and that said Letters Patent is hereby corrected as shown below:

In column 2, line 24 "diameters con be" should read --diameters can be--.

In column 2, line 52 "For the" should read --for the--.

In column 2, line 57, "whereafter particles" should read --whereafter the particles--.

In column 3, line 4, "and stabilizer" should read --and a stabilizer--.

In column 3, line 7, "coalescence the" should read --coalescence of the--.

In column 6, line 10, "amine group" should read --amino group--.

In column 8, line 29, "or the" should read --of the--.

UNITED STATES PATENT AND TRADEMARK OFFICE
CERTIFICATE OF CORRECTION

PATENT NO. : 5,352,521
DATED : October 4, 1994
INVENTOR(S) : Hotta et al.

It is certified that error appears in the above-identified patent and that said Letters Patent is hereby corrected as shown below:

In column 10, line 18, "amine group" should read --amino group--.

In column 12, line 62, "earlier particles" should read --carrier particles--.

In column 17, line 67, "5 g-separable" should read --5 1-separable--.

In column 20, line 17, "1 -separable" should read --1 1-separable--.

In column 22, line 40, "claim 1 and wherein" should read --claim 1 wherein--.

Signed and Sealed this

Second Day of July, 1996

Attest:

BRUCE LEHMAN

Attesting Officer

Commissioner of Patents and Trademarks